United States Patent
Pradhan et al.

(10) Patent No.: US 6,902,829 B2
(45) Date of Patent: Jun. 7, 2005

(54) COATED STEEL ALLOY PRODUCT

(75) Inventors: Rajendra Pradhan, Nazareth, PA (US); C. Ramadeva Shastry, Bethlehem, PA (US)

(73) Assignee: ISG Technologies Inc., Richfield, OH (US)

(*) Notice: Subject to any disclaimer, the term of this patent is extended or adjusted under 35 U.S.C. 154(b) by 137 days.

(21) Appl. No.: 10/627,264

(22) Filed: Jul. 25, 2003

(65) Prior Publication Data

US 2004/0033386 A1 Feb. 19, 2004

Related U.S. Application Data

(63) Continuation-in-part of application No. 10/016,062, filed on Nov. 15, 2001, now Pat. No. 6,635,313.

(51) Int. Cl.[7] .................. B32B 15/18; C22C 18/04; B05D 1/18
(52) U.S. Cl. .............. 428/659; 428/939; 148/533; 148/534; 420/514; 420/520; 427/433; 427/436
(58) Field of Search ................... 428/659, 939; 148/533, 534; 420/514, 520; 427/433, 436

(56) References Cited

U.S. PATENT DOCUMENTS 4,913,785 A   4/1990   Uchida et al.
6,410,163 B1  6/2002   Suzuki et al.

FOREIGN PATENT DOCUMENTS

EP   1 041 167 A1   10/2000

OTHER PUBLICATIONS

Development of 590 MPa Grade Galvannealed Sheet Steels with Dual Phase Structure, Kawasaki Technical Report No. 42, May 2000, Yoichj Tobiyama, et al.
Development of New Formable Cold–Rolled Sheet Steels for Automobile Body Panels,Nippon Steel Technical Report No. 42, Jan. 1995, Atsushi Itami, et al.
Hot Dip Galvannealing of Interstitial Free Steel Strengthened by Manganese, Galvathech 95 Conference Proceedings–115, L. Zhang, et al, (no date given).
Influence of the Dew Point of the $N_2$—$H_2$ Atmosphere During Recrystallization Annealing on the Steel Surface State of TiNb High Strength Steels, 41st MWSP Conf. Proc., ISS, vol. XXXVII, 1999, I. Hertveldt, et al, (no month given).

Primary Examiner—Robert R. Koehler
(74) Attorney, Agent, or Firm—Harold I. Masteller, Jr.

(57) ABSTRACT

A high strength dual phase cold rolled steel having controlled amounts of carbon, manganese, and molybdenum is used as a starting material in a hot-dip zinc coating process to manufacture a high strength dual phase cold rolled steel having a conventional galvanized or galvannealed coating applied to at least one surface thereof, the zinc coated steel product having a uniform coating of zinc in spite of the high manganese content of the steel.

20 Claims, No Drawings

COATED STEEL ALLOY PRODUCT

This is a continuation-in-part of application Ser. No. 10/016,062 filed Nov. 15, 2001, now U.S. Pat. No. 6,635, 313 B2.

FIELD OF THE INVENTION

The present invention is directed to a coated high strength dual phase steel product containing carbon, manganese and molybdenum where conventional hot-dip zinc coating is applied to the product using a galvanizing/galvannealing process having processing conditions normally employed for low and ultra low carbon steels that do not contain easily oxidized and intentionally added alloying elements such as manganese and silicon.

BACKGROUND ART

Earlier patents, that do not appear to anticipate the present invention, and therefore, are disclosed as background information, show that it is known to use conventional hot-dip galvanizing processes to apply conventional hot-dip zinc coatings to the surface of steels for corrosion protection. Such galvanizing processes generally involve heating a steel substrate under controlled conditions, immersing the steel into a molten bath of a coating metal such as zinc or a zinc alloy, and cooling the coated material for further downstream processing and/or subsequent use.

In one exemplary downstream process, known in the coating art as galvannealing, the conventional hot-dip zinc coated material is heated in an annealing furnace, and the reheated zinc coating reacts with the steel material at the interface of the substrate forming a zinc alloy coating on the base steel material during the annealing process. Such galvannealed material is advantageous in that the coated surface exhibits good paint-adherence properties.

One well-known problem related to the use of conventional hot-dip zinc-coating processes is that it is difficult to apply a good quality hot-dip zinc coating to high strength dual phase steels. In order to manufacture high strength steels, it is necessary to add strengthening alloys during the steelmaking process. In the present invention, where strengthening is achieved through the formation of a dual phase microstructure (ferrite plus, primarily martensite), it is necessary to make alloy additions with elements such as Mn, Si, Mo, and Cr. Many of these alloying elements can have a detrimental effect on the coating quality due to zinc dewetting when coated by hot-dip galvanizing. Elements such as Mn, Si, and Cr, that are easily oxidized, and therefore, are troublesome when they are present above levels normally found in the above-mentioned low or ultra low carbon steels. For example, in a galvanneal product, when manganese and silicon are added to high strength steels, and when such high strength steels are hot-dip zinc coated in a conventional continuous hot-dip coating line, the high atmosphere temperature in the recrystallizing/annealing furnace reduces the iron and oxidizes silicon and manganese. This forms either separate or complex manganese and silicon oxides that prevent good zinc adhesion to the steel substrate resulting in bare (uncoated) spots on the coated steel surface. It is expected that other alloy additions, that form more stable oxides than iron, will also produce similar hot-dip zinc coating difficulties during galvanizing process.

The problem of coating high strength steels, particularly those containing large amounts of manganese is recognized in EP 1 041 167 to Kawasaki Steel. This publication admits that it is very difficult to manufacture high strength steel on a hot-dip galvanizing line due to the presence of alloying elements added for strength, and specifically notes the problems with the presence of manganese oxides and the difficulties in zinc coating when these oxides are present.

The Kawasaki Steel EP publication attempts to eliminate the dewetting problems encountered when coating high strength steels with zinc through the use of a specific alloy and a complicated heating cycle. More particularly, Kawasaki Steel employs a particular composition in a steel sheet form and heats the composition to a prescribed level to cause dispersion of a band structure comprising a secondary phase, mainly cementite, pearlite, and bainite, and only partially martensite and residual austenite, to a prescribed extent.

Kawasaki recognizes the problems when the manganese content is high for a steel that is to be galvanized, and suggests that the steel should be first annealed on a continuous annealing line and then heated as part of the galvanizing process. Kawasaki does suggest that a single high temperature heating prior to galvanizing can be done (but provides no specifics as to such a process), and acknowledges that this type of high temperature heating deteriorates the steel surface. To avoid this problem, Kawasaki suggests a two step heating process including first heating the steel in a continuous annealing line at a temperature of at least 750° C., cooling the steel, pickling the steel surface, and then heating the steel between 650° and 950° C. just prior to dipping the steel in the galvanizing hot-dip bath. As part of the second heating step, Kawasaki suggests that the dew point temperature be controlled within −50° C. and 0° C. The steel exemplified in Kawasaki utilized 2.0% by weight manganese, 0.15% by weight molybdenum, and about 0.09% carbon, and the example used a heating-pickling-heating-galvanizing process to coat the material, requiring the use of a continuous anneal line and a galvanizing line.

While Kawasaki suggests ways to avoid the problems of coating high strength steels, the proposed solutions are still disadvantageous in that a special two step processing is required. Thus, when attempting to coat these types of steels, modifications must be made to the conventional galvanizing line, or extra processing steps are required.

Another solution proposed by earlier references related to hot-dip coating problems in high strength steels is electrolytically plating the steel substrate with nickel or an iron-boron alloy as described in U.S. Pat. No. 4,913,785, assigned to Nisshin Steel. Japanese Publication No. JP A 60 262950 also teaches electroplating nickel on steel substrates containing silicon and aluminum as a precursor step for galvanizing.

It has also been suggested that the hydrogen content in the annealing furnace be increased to prevent zinc dewetting on manganese-containing high strength interstitial free steel, see "Hot-dip Galvannealing of Interstitial Free Steel Strengthened by Manganese," Zhang et al., Galvatech '95 Conf. Proc., pp. 115–120. It has also been reported that the dew point of the annealing atmosphere should be increased to improve zinc dewetting on a high strength Mn-containing Ti—Nb interstitial free steel substrate, see "Influence of the Dew Point of the N2–H2 Atmosphere during Recrystallization Annealing on the Steel Surface of TiNb IF High Strength Steels", Hertveldt et al., 41$^{st}$ MWSP Conf. Proc., ISS, Vol. XXXVIII, 1999, pp. 227–234. In this article, it is suggested that increasing the dew point allows the manganese oxides to form internally in the steel rather than on the surface.

In view of the added burdens imposed by the earlier solutions for overcoming problems associated with applying hot-dip zinc coatings to high strength steels, and in particular, to the solutions related to the use of zinc dewetting techniques, there still exists a long felt need for a more simple, and more effective, method to manufacture a hot-dip zinc coated high strength steel product that exhibits good coating adhesion properties. The present invention responds to this need with the discovery that conventional hot-dip zinc coating processes may be used to galvanize or galvanneal a manganese-molybdenum-carbon-containing high strength dual phase steel composition to manufacture a conventional hot-dip zinc coated product having good coating adhesion properties.

SUMMARY OF THE INVENTION

Accordingly, it is a first object of the present invention to provide a conventional hot-dip zinc coated high strength dual phase steel product having good zinc or zinc alloy coating adhesion properties.

It is another object of the present invention to manufacture a conventional hot-dip zinc coated high strength dual phase steel product having good zinc or zinc alloy coating adhesion properties using conventional galvanizing processing conditions that would typically be employed on steels that do not contain alloying element that are easily oxidized.

Another object of the present invention is to provide a conventional hot-dip zinc coated high strength dual phase steel product having good zinc or zinc alloy coating adhesion properties that contains controlled amounts of carbon, manganese, and molybdenum.

A still further object of the invention is a galvanized or galvannealed high strength dual phase steel made by the inventive method, preferably one having a tensile strength ranging between about 500 and 700 MPa.

Yet another object of the present invention is to manufacture a conventional hot-dip zinc coated high strength dual phase steel using a multi-zone furnace wherein the dew point temperature in the furnace varies within a range in the zones and between zones without adversely affecting the quality of the zinc coating on the steel material.

Other objects and advantages of the present invention will become apparent as a description thereof proceeds.

In satisfaction of the foregoing objects and advantages, the present invention is a high strength dual phase steel having an improved zinc or zinc alloy coating applied to at least one surface thereof using conventional hot-dip coating conditions normally used to hot-dip coat steels of lower strength and/or steels having a single phase. The high strength dual phase steel is uniformly coated with the zinc or zinc alloy without a need for special annealing conditions or other processing steps, and the applied coating is absent coating bare spots that are expected when such high strength dual phase steels, containing for example manganese, or chromium, or silicon are hot-dip coated in a conventional processes.

According to the invention, a cold rolled high strength dual phase alloy steel product having a composition consisting essentially of, in weight percent:

carbon between about 0.05 and 0.12%;
manganese between about 1.0 and 1.6%;
phosphorus up to 0.04%;
sulfur up to 0.02%;
silicon up to 0.10%;
molybdenum between about 0.15 and 0.35%;
aluminum between about 0.01 and 0.08%; and
the balance being iron and incidental impurities, is treated in a conventional hot-dip coating line, used for low and ultra low carbon cold rolled steels, to manufacture a conventional hot-dip zinc coated product having a galvanized coating composition consisting essentially of by weight percent:

less than about 1.0% iron, and a preferred iron range of between about 0.2 to 1.0% iron;
less than about 0.002% molybdenum;
between about 0.01 and 0.10% manganese;
between about 0.30 and 0.60% aluminum, or to manufacture a conventional hot-dip zinc coated product having a galvannealed coating composition consisting essentially of by weight percent:

between about 8 and 11% iron;
between about 0.1 and 0.35% molybdenum;
between about 0.01 and 0.10% manganese;
between about 0.15 and 0.30% aluminum; and
up to about 0.16% manganese.

The method for manufacturing the high strength dual phase steel alloy product of the present invention includes heating a fully hard cold rolled steel material in a hot-dip coating line multi-zone reducing atmosphere furnace having a furnace temperature controlled between 760 and 870° C., cooling at a controlled rate to the temperature of a zinc-containing molten bath and then dipping the steel material in the zinc-containing molten bath to produce a zinc coated steel product. As part of the galvanizing process, the furnace conditions in a multi-zone furnace upstream of the galvanizing bath are controlled in temperature and dew point in the same manner as done for lower strength steels lacking easily oxidizable elements such as intentionally added alloying amounts of manganese and silicon.

For example, in a conventional galvanizing line, the dew point may fluctuate considerably across the length of the furnace (as much as 28° C.) and may also fluctuate in specific zones of the furnace. Further, the dew point can often exceed −30° C. However and quite remarkably, these temperatures or variations do not adversely affect the surface quality of the dual phase steel having the composition listed above. For a multi-zone furnace having a preheating zone, a heating zone, a soaking zone, and a cooling zone, and the dew point temperature for each zone preferably ranges between −50 and −20° C. for preheating; −50 and −20° C. for heating; −55 and −25° C. for soaking; and −55 and −20° C. for convection cooling.

The carbon content of the steel can range between about 0.05 and 0.12%, depending on the tensile strength desired, the molybdenum content can range between about 0.20 and 0.35%, and the manganese content can range between about 1.20 and 1.60%.

The zinc-coated steel product can be subjected to a galvanizing anneal after the dipping step to form a galvannealed steel product. The cold worked steel material is be made by continuous casting. Preferably, the material is first continuously cast into a strand, the strand is then heated and hot rolled and coiled into a strip, and the strip is cold rolled such that the steel is in the fully hard condition for the annealing and dipping steps.

It is preferred that, that before the hot-dip coated high strength steel alloy has a dual phase microstructure of ferrite and, primarily martensite, and that after hot-dip coating, the coated product has good zinc adhesion properties for both galvanized and galvanneal coatings applied with conventional coating processes, and that the conventional hot-dip zinc coated dual phase steel has a tensile strength between 500 and 700 MPa with a preferred tensile strength of at least about 590 MPa.

DESCRIPTION OF THE PREFERRED EMBODIMENTS OF THE INVENTION

The present invention offers significant improvements in the field of manufacturing a hot-dip zinc coated high strength dual phase steel product. As recognized in the above teaching of the past, such steels typically contain large amounts of manganese, and coating conditions must be strictly controlled, and/or additional processing steps must be employed to avoid the creation of manganese oxides on the steel surface prior to coating.

The present invention overcomes these drawbacks by first employing a high strength dual phase steel composition having controlled amounts of carbon, manganese, and molybdenum to achieve target mechanical properties. Surprisingly, this steel type and composition can be used in a conventional galvanizing line that employs control parameters that are used for other grades of more easily coated steel, e.g., lower strength steels such as low and ultra low carbon steels that lack oxidation-prone alloying elements such as intentionally-added manganese and silicon. In these low or ultra low carbon steel types where manganese and silicon are not employed in specific alloying amounts, the levels of manganese and silicon are typically in normal residual amounts, e.g., no more than about 0.50% manganese and no more than about 0.1% silicon.

In the preferred embodiment of the present invention, the same conventional galvanizing line hot-dip coating process may be used to zinc coat a manganese and molybdenum-containing high strength dual phase alloy steel as well as low and ultra low carbon steels. This eliminates the need for precise controls and/or extra processing steps common to the above-mentioned earlier teaching for such high strength steels. Consequently, mill operators may now use the same more user friendly conventional galvanizing line to manufacture both a high strength zinc coated steel product as well as a lesser strength low or ultra low carbon zinc coated steel product. This ability results in lowered manufacturing costs for the coated steel product manufacturer.

The invention is also advantageous in providing a high strength dual phase cold rolled steel that has a uniform galvanized or galvannealed coating. Considering past difficulty in hot-dip coating a high strength steel containing manganese, chromium, and silicon, and also taking into account the ever present bare spot problems associated with hot-dip zinc coating such high strength steels, the present invention more easily manufactures a high quality zinc coated high strength steel product. Accordingly, the improved coated steel product is a significant step forward in the art, and the finished coated product provides an important advantage in the marketplace. Specifically, because the improved zinc coated steel products have a tensile strength ranging between about 500 and 700 MPa; the high strength dual phase coated steels of the present invention have significant demand in automotive sheet steel applications.

In one embodiment, the steel for use in the invention is a high strength dual phase steel composition consisting essentially of, in weight percent:

| | |
|---|---|
| carbon | 0.05–0.12% |
| manganese | 1.0–1.6% |
| phosphorous | a maximum of 0.04% |
| sulfur | a maximum of 0.02% |
| silicon | a maximum of 0.10% |
| aluminum | 0.01–0.08% |
| molybdenum | 0.15–0.30% |
| with the balance iron and inevitable impurities. | |

Dual phase steels of the past and the steel used to manufacture the improved zinc coated product of the present invention comprises ferrite and martensite.

Preferred ranges of the carbon content include between about 0.05 and 0.12% depending on the desired tensile strength. The carbon content controls the amount of martensite in the microstructure.

Manganese is also an important element in providing the strength properties and dual phase structure to the steel. Preferred levels of manganese include between 1.0 and 1.6%. More preferred ranges include 1.4 and 1.6%, with a target of around 1.5%.

Molybdenum is another important element in attaining the high strength properties of the dual phase steel while at the same time contributing to the improved coating capability. Preferred ranges include between about 0.15 and 0.35%, more preferred ranges include between about 0.20 and 0.30%, and a preferred target is about 0.25%.

The levels of sulfur, phosphorous, silicon, aluminum, and impurities are considered to be typical of the levels normally employed for these types of steels. Sulfur has a maximum of 0.02%, phosphorous has maximum of 0.04%, silicon has a maximum of 0.10%, and aluminum ranges between about 0.01 and 0.08%.

One typical target chemistry for a 590 MPa tensile strength could be, in weight percent, 0.10% C, 1.5% Mn, 0.02% P, 0.01% S, 0.05% Si, 0.04% Al, 0.30% Mo, with the balance iron and incidental impurities.

Typical mechanical properties for a steel with a target of 590–600 MPa minimum tensile strength include 380 MPa yield strength, 620 MPa tensile strength, 85 MPa bake hardening (after 2% tensile prestrain and baking at 170° C. for 20 minutes), 25% total elongation (12.5 mm gauge width), 28% total elongation (25 mm gauge width), and n values of 0.21 ($\epsilon$=4–6%), 0.18 ($\epsilon$=5–15%), and 0.16 ($\epsilon$=5%-Uniform Elong.).

The steel is processed into a fully hard cold worked or rolled form prior to galvanizing. That is, the steel is cast, either by ingot or by continuous casting techniques. The cast product is then processed conventionally by hot-rolling, cold-rolling, and annealing. For hot rolling, the slab reheat temperature should be 1250° C. maximum, the finishing temperature should be 840° C. minimum, and the coiling temperature should range between about 560–730° C. For cold working, the reduction is preferably at least 50%.

In the conventional or typical galvanizing line, the galvanizing furnace is multi-zone, and comprises a preheat zone followed by a heating zone, soaking zone, and a convection cooling zone. The preheating zone furnace temperature ranges up to about 177° C., with the heating zone being controlled typically between 760° C. and 870° C. It should be understood though that the upper limit for dual phase steel galvanizing/galvannealing is 820° C. The dew point temperature of the furnace ranges between: −50 and −20° C. for preheating; −50 and −20° C. for heating; −55 and −25° C. for soaking; and −55 and −20° C. for convection cooling. A cooling rate of between 5 and 50° C./sec is used during the convection cooling section. Typically, the furnace atmosphere is about 5% hydrogen with the balance nitrogen. The dew point is monitored to stay within the prescribed ranges. The pot chemistry for galvanizing should be between about 0.1 and 0.25% aluminum, and between about 0.1 and 0.15% for galvannealing.

For galvannealing, the furnace temperature should be between about 465° and 550° C. with a line speed of 50–120 m/min. Temper reduction should be about 0.5% max. Other particulars of the casting, rolling, annealing, galvanizing/ galvannealing, etc., are well known in the art, and a more detailed description is not deemed necessary for understanding of the invention.

The cold worked product as a strip or sheet can range in thickness and width as is normally used in galvanizing processes, up to 2.0 mm in thickness and up to 1830 mm in width. In addition, the cold worked/rolled steel is considered to be in its fully hard condition, not softened by annealing or the like. Since it is preferred to galvanize strip or sheet product, hereinafter, cold working will be referred to cold rolling. However, the steel material could take on other forms as would be within the skill of the artisan such that working other than rolling could be employed in anticipation of galvanizing.

As stated before, a significant advantage of the invention is the ability to use a conventional multi-zone galvanizing furnace to process the high strength dual phase steel into a coated product. When steel compositions having high levels of manganese are coated, much difficulty is encountered in controlling the presence of manganese oxides on the steel surface prior to the hot-dipping step. Certain earlier teaching indicates that it is extremely difficult to coat these materials without additional steps and controls such as shown in the Kawasaki Steel EP publication discussed above.

One way to control the presence of manganese oxides is through dew point control in the furnace. That, it is desirable to maintain a strong reducing-type atmosphere to inhibit the formation of undesirable oxides on the surface of the material to be galvanized. For the inventive composition, theoretical calculations indicate that the dew point should be maintained around −68° C. with a range of between approximately −70° C. and −64° C. depending on the annealing temperature selected. However, it is difficult to control or maintain such a target dew point within a conventional multi-zone furnace, particularly since other grades of steel do not need such a tight range or high value for the dew point. For example, it is not uncommon for the dew point during conventional galvanizing to go as high as −20° C.

Surprisingly, it was discovered that a steel composition, having controlled amounts of molybdenum, manganese, and carbon levels, as disclosed above for the present invention, may be processed under furnace conditions used in a conventional galvanizing line designed to treat lower strength low carbon and ultra-low carbon steels. Low and ultra low carbon steel compositions do not contain elements that are readily oxidized during galvanizing and galvannealing processes, for example, manganese, and silicon. Therefore, problems associated with hot-dip coating high strength steels are not encountered. It has been found that the controlled high strength dual phase steel compositions, as identified above for the present invention, may be galvanized and galvannealed as if they were a low or ultra low carbon steel. Accordingly, the present invention avoids the need for using complicated processing sequences as suggested in the Kawasaki Steel EP publication for steels having high levels of manganese, e.g., the Kawasaki two-step process that requires 1) annealing, and pickling, followed by 2) reheating, and galvanizing. The results in the present invention are unexpected because earlier teaching clearly suggests it is extremely difficult to manufacture a quality hot-dip zinc coated high strength manganese-containing steels without special processing steps and/or conditions. Therefore, the teaching suggests a conventional galvanized or galvanneal coating cannot be applied to the surface of such high strength steels. However, this teaching is not correct when considering the present invention. It has been further discovered that a quality conventional galvanized or galvanneal coating, absent bare spots and exhibiting good coating adhesion properties, may be applied to a high strength manganese-containing steel if the steel substrate is similar to the high strength dual phase steel composition specified above for the present invention. Furthermore, it has also been discovered that the high quality, uniform zinc or zinc alloy coating may be applied using conventional galvanizing conditions without encountering the coating bare spots associated with hot-dip zinc coating such high strength materials.

A number of studies were conducted using a steel composition and galvanizing conditions. One set of galvanizing studies was performed using simulator conditions with the second set of studies performed under mill conditions. The composition of this steel used for the studies had a target chemistry, in weight percent, of 0.11% C, 1.5% Mn, 0.02% P, 0.01% S, 0.05% Si, 0.04% Al, 0.30% Mo, with the balance iron and incidental impurities. All percent designations hereinafter are in weight percent.

In one aspect of the studies, galvanizing and galvannealing were investigated using a hot-dip simulator. Because the selected alloy is high in manganese, surface oxidation during annealing and commercially practical dew points were identified as a concern. As part of this study, thermodynamic calculations were made to show the target dew point temperature range for annealing. These calculations indicated that the dew point of the 760° C. annealing atmosphere must be less than −70° C. to prevent surface oxidation of the manganese in the alloy. The problem with this target temperature is that commercial installations usually cannot effectively control the dew point to less than −57° C.

The simulator experiments for galvanizing started with a full hard material. The material was annealed at 760° C. using a typical 5% $H_2$—$N_2$ atmosphere with varying dew points of −73, −46, and −17.8° C. A galvanizing pot temperature of 454–471° C. was used with a pot aluminum content of between 0.15 and 0.20%, a target coating weight of 70/70 $g/m^2$, a dip time of about 2.6 sec (corresponding to about 330 feet/min speed through the dip tank), and maximum air cooling after dipping.

For galvannealing, the dew point was varied between −46 and −73° C., the pot temperature was 454° C., the pot aluminum was 0.135% and 0.115% saturated with iron, the coating target weight was 50/50 $g/m^2$, the dip time was 3.7 sec (230 feet/min), the galvannealing temperatures varied as 477, 504, and 527° C., and heat up and soak times were 27 and 35 seconds, respectively. Evaluations were based on a 90° bend test for adhesion, coating chemistry, and morphology.

The simulator experiments revealed that manganese oxidation occurs at dew points above −70° C., e.g., −46 and −17.8° C., but that the manganese and iron content of the oxide varies with the dew point in a complex manner. These experiments showed that the steel can be satisfactorily galvannealed in the 477–532° C. temperature range and at melt levels of from 0.1% to 0.143% aluminum. The lowest dew point used in these studies, −73° C., produced the best surface results with respect to freedom from bare spots during coating. Increasing bare spots were noted when annealing was performed at higher dew points.

The following Table 1 correlates pinholes and surface appearance to dew point temperature as produced on the steel during the galvanizing simulator study.

TABLE 1

| Dew Point ° C. | No. of bare spots/pin holes per side | Comments |
| --- | --- | --- |
| −73 | 0–1 | excellent adhesion and appearance |
| −46 | 3–4 | excellent adhesion and good appearance |
| −36.1 | 35 | excellent adhesion and marginal appearance |
| −17.8 | >50 | unacceptable appearance |
| 0.206% pot aluminum content | | |

From the simulator study, and based on the Table 1 results, it was believed that the present grade of steel was not amenable to galvanizing or galvannealing because the requirements for control of the dew point temperature, i.e., −70° C. or lower, were not feasible on conventional galvanizing lines. Typically, the dew points in these lines vary substantially between the various furnace zones, e.g., from around −29° C. in one zone to up to near only −51° C. in another zone. With such a variance in dew points and lack of precise control to maintain low dew points, i.e., less than −70° C. along the length of the furnace, it was thought that this steel was not a good candidate for galvanizing/galvannealing.

In conjunction with the simulator studies, further testing was performed using a commercial line. The commercial line included those components typically used in a galvanizing/galvannealing line, including a furnace having a strip preheat section, a radiant tube heating section, a radiant tube soaking section, and a gas jet cooling section located upstream of the hot-dip zinc coating pot. Components downstream from the hot-dip zinc coating pot included an arrangement of air or nitrogen gas wipe knives. In instances where galvannealed product is produced, the coating line includes a galvannealing section downstream from the hot-dip zinc coating pot, the galvannealing section comprising a galvanneal heating furnace and a galvanneal soak furnace followed by cooling sections. Downstream from the gas wipe knives and/or galvannealing and cooling section, the coated product enters a rolling line that includes temper rolling and tension leveling stations, followed by coiling and/or surface treating stations found in most conventional lines. It should be understood that the components making up the galvanizing/galvannealing line are well known in the art, and a further description thereof is not deemed necessary for understanding of the present invention.

In conducting the commercial line study, the conditions used for galvanizing were as follows:

| | |
| --- | --- |
| coil size | 1.3 mm thick by 1525 mm wide |
| dew point targets T° C. | preheat −26; heat −41; soak −54; convecool −51 (typical) |
| line speed | 100 meters/min. |
| annealing T° C. | 785° C. |
| pot temperature | 468° C. |
| pot aluminum | 0.164% aluminum 0.039% iron |
| coating weight | 74/85 g/m² |
| coating comp. top | 0.30% aluminum, 1.11% iron, bal. zinc |
| coating comp. bottom | 0.29% aluminum, 1.05% iron, bal. zinc |
| temper mill | 0.5% extension |

The term "convecool" is a common term used within the industry. It refers to rapid cooling of the steel substrate in a protective atmosphere, from substrate recrystallization temperature to a desired substrate temperature range for entry into the hot-dip zinc coating pot.

The steel was also subjected to two galvannealing runs, wherein the conditions for the first run were as follows:

| | |
| --- | --- |
| coil size | 1.3 mm thick by 1525 mm wide |
| dew point target T° C. | preheat −29; heat −41; soak −46; convecool −36 (typical) |
| line speed | 65 meters/min. |
| annealing T° C. | 785° C. |
| coating weight | 53/54 g/m² |
| coating comp. top | 11.6% iron |
| coating comp. bottom | 13.6% iron |
| temper mill | 0.5% extension |

(pot temperature and pot aluminum were not recorded but are believed to be similar to those used in conventional galvannealing and are also similar to the following run)

The second galvannealing run conditions were as follows:

| | |
| --- | --- |
| coil size | 1.22 mm thick by 1525 mm wide |
| dew point ranges T° C. | preheat −24; heat −27; −soak −36; and convecool −33 |
| line speed | 65 meters/min. |
| coating target weight | 53/54 g/m² |
| annealing T° C. | 785° C. |
| galvanneal furnace exit | 460–477° C. |
| pot chemistry | 0.143% aluminum, 0.03% iron |
| coating comp. top | 9.6–10.1% iron |
| coating comp. bottom | 9.9–10.0% iron |
| temper mill | 0.5% extension |

Quite remarkably in view of the variance and relatively high dew point temperatures of the furnaces in each run, each of the galvanized and galvannealed steels exhibited superior surfaces. The large number of bare spots present during the simulator runs when the dew point was higher than −46° C. were noticeably absent. In fact, the surface of each product was good in that there were substantially no discernible bare spots. For the galvanneal runs, the galvanneal coating was fully alloyed and devoid of bare spots. Coating adhesion using the 90° bend mass loss test for this run was also good (all sections tested under 5 mg loss), as was the visual rating, i.e., ≦3.

The conventional hot-dip coated dual phase steel products were analyzed to determine their coating composition, and it was discovered that the galvanized coating has an Fe content of less than about 1% and a Mo content of less than about 0.002%. Table 2 shows composition ranges for a selected exemplary coil sample. Based upon the test data, it is determined that a preferred Fe range is between about 0.2 and 1.0% with Mo less than 0.0005% (below detectable limits). Al is between about 0.3 and 0.6% and Mn between about 0.045 and 0.065%.

TABLE 2

| Coil No. | Steel Substrate Side | Coating Mass g/m² | Coating Composition, wt % | | | |
|---|---|---|---|---|---|---|
| | | | Fe | Mo | Mn | Al |
| H93054 | Top | 86.9 | 0.296 | <0.0004 | 0.046 | 0.409 |
| | Bottom | 67.3 | 0.352 | <0.0005 | 0.061 | 0.441 |

The tested dual phase galvannealed samples, as listed in Table 3, show an Fe content above 8.0% in and Mn between about 0.145 and 0.160%. The range for Al is between about 0.15 to 0.25% and Mo between about 0.015 and 0.035%.

TABLE 3

| Coil No. | Location | Steel Substrate Side | Coating Mass g/m² | Coating Composition, wt % | | | |
|---|---|---|---|---|---|---|---|
| | | | | Fe | Mo | Mn | Al |
| H93054 | Edge 1 | Top | 49.8 | 8.92 | 0.024 | 0.158 | 0.193 |
| | | Bottom | 53.3 | 9.21 | 0.023 | 0.149 | 0.210 |
| | Center | Top | 49.2 | 9.51 | 0.023 | 0.151 | 0.219 |
| | | Bottom | 48.0 | 9.32 | 0.020 | 0.150 | 0.211 |
| | Edge 2 | Top | 50.0 | 9.50 | 0.020 | 0.152 | 0.207 |
| | | Bottom | 48.7 | 9.42 | 0.019 | 0.157 | 0.213 |

These results are quite surprising given the high content of the manganese in the steel. One would expect based on the theoretical calculations and the simulator tests noted above that the dew point target temperatures and ranges in the conventional line would be too high to produce a quality and good coated product surface. The discovery that it is possible to manufacture a good quality conventional galvanized or galvannealed high strength dual phase steel is a significant advance in the art. Heretofore, coating such high strength steels has been difficult at best when using conventional hot-dip coating line conditions. As explained in the Kawasaki EP publication, other non-conventional steps are required in order to coat such types of steels.

While the exact mechanism is unknown as to why the high strength dual phase steel is coating-friendly under dew point conditions used for low and ultra low carbon steels lacking oxidation-prone elements such as manganese and silicon, it is believed that the increased levels of molybdenum may contribute to the suppression and/or modification of the characteristics of manganese oxides on the steel surface. However, given the complexity of the coating process in general, the exact reason may be a number of processing and alloying element factors together.

The commercial line studies show that the steel can be exposed to a wide variation in the dew point temperature without a loss in surface appearance. In both runs, the dew point was as high as −26° C. in the preheat section, and varied 28° C. along the furnace length, −26° C. to −54° C. In general, conventional furnaces can control to about −57° C., but the steel can be subjected to considerably higher dew points over the length of the furnace, particularly during preheating. However, when using the specified high strength dual phase steel, dew point control is less critical, and conventional dew point controls and ranges can be utilized for effectively coating this high strength dual phase material.

The results of the studies clearly show that a high strength dual phase cold rolled steel could be subjected to swings in furnace dew point temperature and higher than expected dew point temperatures in general, and produce an acceptable zinc-coated steel material.

As such, an invention has been disclosed in terms of preferred embodiments thereof which fulfills each and every one of the objects of the present invention as set forth above and provides a new and improved zinc coated steel composition having high strength and a dual phase, and a method of making.

Of course, various changes, modifications and alterations from the teachings of the present invention may be contemplated by those skilled in the art without departing from the intended spirit and scope thereof. It is intended that the present invention only be limited by the terms of the appended claims.

We claim:

1. A zinc coated high strength steel product comprising a hot-dip zinc coating applied to at least one surface of a high strength steel sheet, the composition of said hot-dip zinc coating consisting essentially of by weight percent;
   iron less than about 1.0%;
   molybdenum less than about 0.002%;
   aluminum between about 0.3 and 0.6%; and
   manganese between about 0.01 and 0.10%.

2. The invention recited in claim 1, the composition of said high strength steel sheet consisting essentially of by weight percent;
   carbon between about 0.05 and 0.12%,
   manganese between about 1.0 and 1.6%,
   phosphorus up to 0.04%,
   sulfur up to 0.02%,
   silicon up to 0.10%,
   molybdenum between about 0.15 and 0.35%,
   aluminum between about 0.01 and 0.08%, and
   the balance being iron and incidental impurities.

3. The invention recited in claim 1 wherein said high strength steel sheet has a galvanized coating applied to at least one surface thereof, the composition of said galvanized coating consisting essentially of by weight percent;
   iron between about 0.2 and 1.0%,
   molybdenum less than about 0.0005%,
   aluminum between about 0.3 and 0.6%, and
   manganese between about 0.01 and 0.10%.

4. The invention recited in claim 1 wherein said high strength steel sheet has a galvanneal coating applied to at least one surface thereof, the composition of said galvanneal coating consisting essentially of by weight percent;
   iron above about 8.0%,
   molybdenum less than about 0.035%,
   aluminum between about 0.15 and 0.30%, and
   manganese less than about 0.160%.

5. The invention recited in claim 4, the composition of said galvanneal coating consisting essentially of by weight percent;
   iron above about 8.0%,
   molybdenum between about 0.015 and 0.025%,
   aluminum between about 0.15 and 0.30%, and
   manganese between about 0.145 and 0.160%.

6. A fully hard worked and zinc coated high strength dual phase steel having a conventional hot-dip zinc coating applied to at least one surface thereof, the composition of said high strength dual phase steel consisting essentially of by weight percent;

carbon between about 0.05 and 0.12%;
manganese between about 1.0 and 1.6%;
phosphorus up to 0.04%;
sulfur up to 0.02%;
silicon up to 0.10%;
molybdenum between about 0.15 and 0.35%;
aluminum between about 0.01 and 0.08%; and
the balance being iron and incidental impurities;
the composition of said conventional hot-dip zinc coating applied to at least one surface thereof consisting essentially of by weight percent;
iron less than about 1.0%;
molybdenum less than about 0.002%;
aluminum between about 0.3 and 0.6%; and
manganese between about 0.01 and 0.10%.

7. The invention recited in claim 6 wherein said high strength steel sheet has a conventional galvanized coating applied to at least one surface thereof, the composition of said conventional galvanized coating consisting essentially of by weight percent;
iron between about 0.2 and 1.0%;
molybdenum less than about 0.0005%;
aluminum between about 0.3 and 0.6%; and
manganese between about 0.01 and 0.10%.

8. The invention recited in claim 6 wherein said high strength steel sheet has a conventional galvanneal coating applied to at least one surface thereof, the composition of said conventional galvanneal coating consisting essentially of by weight percent;
iron above about 8.0%,
molybdenum less than about 0.035%,
aluminum between about 0.15 and 0.30%, and
manganese less than about 0.160%.

9. The invention recited in claim 8, the composition of said conventional galvanneal coating consisting essentially of by weight percent;
iron above about 8.0%;
molybdenum between about 0.015 and 0.025%;
aluminum between about 0.15 and 0.30%; and
manganese between about 0.145 and 0.160%.

10. The invention recited in claim 6 whereby said conventional hot-dip zinc coating is applied in a conventional galvanizing line.

11. The invention recited in claim 8 whereby said conventional galvanneal coating is applied in a conventional galvannealing line.

12. A fully hard worked and zinc coated high strength dual phase steel product having a conventional hot-dip zinc coating applied at least one surface thereof in a conventional galvanizing line, the composition of said high strength dual phase steel consisting essentially of by weight percent;
carbon between about 0.05 and 0.12%,
manganese between about 1.0 and 1.6%,
phosphorus up to 0.04%,
sulfur up to 0.02%,
silicon up to 0.10%,
molybdenum between about 0.15 and 0.35%,
aluminum between about 0.01 and 0.08%, and
the balance being iron and incidental impurities;
the composition of said conventional hot-dip zinc coating applied to at least one surface thereof consisting essentially of by weight percent;
iron less than about 1.0%,
molybdenum less than about 0.002%,
aluminum between about 0.3 and 0.6%, and
manganese between about 0.01 and 0.10%.

13. The invention recited in claim 12 wherein said conventional hot-dip zinc coating is a galvanized coating applied in a conventional galvanizing line, the composition of said galvanized coating consisting essentially of by weight percent,
iron between about 0.2 and 1.0%,
molybdenum less than about 0.0005%,
aluminum between about 0.3 and 0.6%, and
manganese between about 0.01 and 0.10%.

14. The invention recited in claim 12 wherein said applied conventional hot-dip zinc coating is a galvanneal coating applied in a conventional galvanneal line, the composition of said galvanneal coating consisting essentially of by weight percent;
iron above about 8.0%,
molybdenum less than about 0.035%,
aluminum between about 0.15 and 0.30%, and
manganese less than about 0.160%.

15. The invention recited in claim 14, the composition of said galvanneal coating consisting essentially of by weight percent;
iron above about 8.0%,
molybdenum between about 0.015 and 0.025%,
aluminum between about 0.15 and 0.30%, and
manganese between about 0.145 and 0.160%.

16. In a process for coating low and ultra low carbon cold rolled steel materials with a zinc coating by first heating a fully hard cold worked steel material in a galvanizing line multi-zone reducing atmosphere furnace having a controlled furnace temperature between 760 and 820° C., and then immersing the heated steel material in a zinc-containing molten bath to produce a zinc coated steel product, the steps of the improved process comprising:
a) maintaining the same multi-zone reducing atmosphere furnace condition;
heating a high strength dual phase steel sheet in said multi-zone reducing atmosphere furnace;
c) applying a hot-dip zinc coating to at least one side of said steel sheet;
d) cooling said hot-dip zinc coated steel sheet to manufacture a zinc coated steel product having a zinc coated surface composition consisting essentially of by weight percent;
iron less than about 1.0%;
molybdenum less than about 0.002%;
aluminum between about 0.3 and 0.6%; and
manganese between about 0.01 and 0.10%.

17. The zinc coated steel product manufactured according to the process of claim 16, the composition of said high strength dual phase steel sheet consisting essentially of, in weight percent;
carbon between about 0.05 and 0.12%,
manganese between about 1.0 and 1.6%,
phosphorus up to 0.04%,
sulfur up to 0.02%,
silicon up to 0.10%,
molybdenum between about 0.15 and 0.35%,
aluminum between about 0.01 and 0.08%, and
the balance being iron and incidental impurities.

18. A zinc coated steel product manufactured according to the process of claim 16, wherein said zinc coated surface is a galvanized coated surface, the composition of said galvanized coated surface consisting essentially of by weight percent;

iron between about 0.2 and 1.0%,
molybdenum less than about 0.0005%,
aluminum between about 0.3 and 0.6%, and
manganese between about 0.01 and 0.10%.

19. The process according to claim 16 including:

e) annealing said hot-dip zinc coated steel sheet, and
f) cooling said galvanneal coated steel sheet to manufacture a zinc coated steel product having a galvanneal coated surface composition consisting essentially of by weight percent;

iron above about 8.0%,
molybdenum less than about 0.035%,
aluminum between about 0.15 and 0.30%, and
manganese less than about 0.160%.

20. A zinc coated steel product manufactured according to the process of claim 19, the composition of said galvanneal coated surface consisting essentially of by weight percent;

iron above about 8.0%,
molybdenum between about 0.015 and 0.025%,
aluminum between about 0.15 and 0.30%, and
manganese between about 0.145 and 0.160%.

* * * * *